United States Patent Office 3,555,012
Patented Jan. 12, 1971

---

3,555,012
DIBENZOTHIADIAZOCINE DERIVATIVES
Michio Nakanishi, Nakatsu, Oita, and Tomohiko Munakata and Tatsumi Tsumagari, Fukuoka, Japan, assignors to Yoshitomi Pharmaceutical Industries, Ltd., Osaka, Japan
No Drawing. Filed Apr. 2, 1969, Ser. No. 812,887
Int. Cl. C07d *41/00, 41/06, 53/00, 87/54, 93/36*
U.S. Cl. 260—239.3
20 Claims

---

ABSTRACT OF THE DISCLOSURE

Dibenzothiadiazocine derivatives of the formula

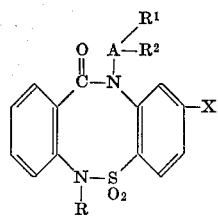

wherein X is H, Cl, $OCH_3$, $CH_3$ or $CF_3$, R is benzyl or alkyl of 1 to 4 carbon atoms such as methyl, ethyl, propyl, isopropyl, butyl or isobutyl, each of $R^1$ and $R^2$ independently is alkyl of 1 to 4 carbon atoms, phenyl or benzyl, or —$N(R^1)(R^2)$ is morpholino, piperidino, 2-methylpiperidino, 4-methyl-1-piperazinyl, 4 - phenyl - 1-piperazinyl, and A is alkylene of 2 to 4 carbon atoms such as ethylene, propylene, trimethylene or 2-methyltrimethylene, and pharmaceutically acceptable acid addition salts possess analgesic and anti-inflammatory activity.

---

This invention relates to novel and therapeutically valuable dibenzothiadiazocine derivatives.

The novel dibenzothiadiazocine derivatives of the invention are the compounds of Formula I as well as pharmaceutically acceptable acid addition salts thereof:

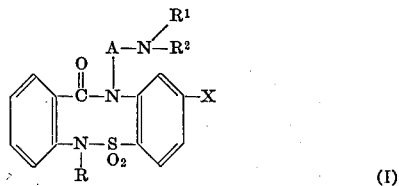

wherein X is H, Cl, $OCH_3$, $CH_3$ or $CF_3$, R is benzyl or alkyl of 1 to 4 carbon atoms such as methyl, ethyl, propyl, isopropyl, butyl or isobutyl, each of $R^1$ and $R^2$ independently is alkyl of 1 to 4 carbon atoms, phenyl or benzyl, or —$N(R^1)(R^2)$ is morpholino, piperidino, 2-methylpiperidino, 4-methyl-1-piperazinyl, 4 - phenyl - 1-piperazinyl, and A is alkylene of 2 to 4 carbon atoms such as ethylene, propylene, trimethylene or 2-methyltrimethylene.

The compounds of Formula I are produced by reacting an 11-R-dibenzo(c,g)(1,2,6)thiadiazocin-6-one 12,12-dioxide of the formula

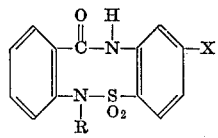

wherein R and X have the same meaning as above, with an amine of the formula

wherein A, $R^1$ and $R^2$ have the same meaning as above, and Y is halogen such as Cl, Br or I, or organic sulfonyloxy such as methylsulfonyloxy or p-tolylsulfonyloxy.

The starting compounds of Formula II are preferably used in the form of an alkali metal salt such as sodium or potassium salt, which is prepared by treating a compound of Formula II with an alkali metal compound such as sodium amide, potassium amide, sodium hydride or the like.

The reaction is usually carried out in an inert solvent such as benzene, toluene, xylene, ether, tetrahydrofuran, dioxane or dimethylformamide, at an elevated temperature between about 30° C. and about 200° C., conveniently, for example, at about the boiling point of the solvent employed for one to several hours.

The compounds of Formula I can be converted in a conventional manner into the corresponding acid addition salts with various inorganic or organic acids such as hydrochloric, hydrobromic, sulfuric, nitric, oxalic, maleic, fumaric, tartaric, citric acid and the like.

The compounds of Formula I and pharmaceutically acceptable acid addition salts thereof have analgesic and anti-inflammatory action as shown, for example, by the following tests; in which the alphabetical notations A to G mean the following compounds, respectively:

(A) 11-methyl-5-(3-diethylaminopropyl) - dibenzo(c,g) (1,2,6)-thiadiazocin-6-one 12,12-dioxide hydrochloride with ½ molecule of water of crystallization;

(B) 11 - methyl - 5 - (3-piperidinopropyl)-dibenzo(c,g) 1,2,6) - thiadiazcin-6-one 12,12 - dioxide hydrochloride with 2 molecules of water of crystallization;

(C) 11-methyl - 5 - (2-morpholinoethyl)-dibenzo(c,g) (1,2,6)-thiadiazocin-6-one 12,12 - dioxide hydrochloride;

(D) 11 - ethyl - 5 - (1-methyl-2-dimethylaminoethyl)-dibenzo(c,g)(1,2,6)thiadiazocin - 6 - one 12,12-dioxide fumarate;

(E) 11 - methyl-5-(2 - dimenthylaminopropyl) - dibenzo (c,g)(1,2,6)thiadiazocin-6-one 12,12 - dioxide hydrochloride;

(F) 11 - methyl-5 - (2 - dimethylaminoethyl) - dibenzo (c,g)(1,2,6)thiadiazocin-6-one 12,12 - dioxide hydrochloride;

(G) 11 - methyl-5-(2 - methyl-3-dimethylaminopropyl)-dibenzo(c,g)(1,2,6)thiadiazocin-6-one 12,12 - dioxide hydrochloride with ½ molecule of water of crystalization.

ANTI-INFLAMMATORY ACTION (1) Carrageenin edema method.—The test was performed essentially in accordance with the method described by Charles A. Winter et al. in Proceedings of the Society for Experimental Biology and Medicine, vol. 111, pp. 544–547 (1962).

A 1% aqueous solution of carrageenin (0.05 ml.) was injected subcutaneously into the hind paw of rat. The test compound was suspended in a 1% aqueous polysorbate 80 solution and the suspension (5 ml./200 g. of body weight) was administered orally one hour before the injection of carrageenin. The volume of paw was measured after 3 hours, and the increase of this volume in percent of controls was observed and $ED_{50}$ value was determined.

TABLE 1

| Compound: | $ED_{50}$ (mg./kg.) |
|---|---|
| A | 300 |
| B | 250 |
| C | 200 |
| D | 36 |
| E | 60 |
| F | 160 |
| G | 160 |
| Oxyphenbutazone | 330 |

(2) Carrageenin abscess method.—The test was performed essentially in accordance with the method described by K. F. Benitz et al. in Archives Internationales de Pharmacodynamie et de Therapie, vol. 144, pp. 185–194 (1963).

A 2% aqueous solution of carrageenin (0.5 ml.) was injected subcutaneously into the back of rat. One-half of the total dose of the test compound was administered orally immediately following the injection of carrageenin and the remaining half was given 6 hours later. Animals were sacrificed after 24 hours by ether inhalation. The abscess was dissected and weighed. Degree of inhibition is shown in Table 2 in terms of difference of abscess weight in percent relative to controls.

TABLE 2

| | Dose (mg./kg.) | Inhibition (percent) |
|---|---|---|
| Compound: | | |
| B | 100 | 15.3 |
| | 200 | 6.0 |
| E | 100 | 14.2 |
| | 200 | 37.4 |
| F | 100 | 15.6 |
| | 200 | 12.8 |
| G | 200 | 10.8 |
| Oxyphenbutazone | 75 | 7.6 |
| | 150 | 31.5 |
| Mefenamic acid | 200 | 6.1 |
| | 400 | 21.6 |

ANALGESIC ACTIONS (1) Electrical stimulation method.—The test was performed essentially in accordance with the method described by G. Hayashi et al. in Journal of the Pharmaceutical Society of Japan, vol. 78, pp. 716–721 (1957).

An aqueous solution of the test compound was injected intraperitoneally into the mouse pre-treated with morphine (1 mg./kg. of body weight). The tail of the mouse was electrically stimulated (40 volts for 0.005 second per time) every second.

The analgesic activities are calculated by the following equation:

$$\text{Inhibition rate (percent)} = \frac{b-a}{30-a} \times 100$$

(a) Mean value of pain threshold in three tests before injection of the test compound (in seconds);
(b) Maximum value of pain threshold after injection of the test compound (in seconds).

TABLE 3

| | Dose (mg./kg.) | Inhibition (percent) |
|---|---|---|
| Compound: | | |
| B | 200 | 29.6 |
| C | 200 | 21.4 |
| D | 200 | 89.2 |
| E | 200 | 27.7 |
| F | 200 | 25.9 |
| G | 200 | 27.7 |
| Oxyphenbutazone | 200 | (*) |
| Mefenamic acid | 200 | 13.6 |

*All test animals (10 mice) died during the test due to the toxicity of the compound.

(2) Chemical stimulation method.—The test was performed essentially in accordance with the method described by L. C. Hendershot et al. in Journal of Pharmacology and Experimental Therapeutics, vol. 125, pp. 237–240 (1959).

A 0.02% aqueous solution of benzoquinone (0.2 ml./20 g. of body weight) was injected intraperitoneally into a mouse. The test compound was suspended in a 1% aqueous polysorbate 80 solution and on the suspension (0.1 ml./10 g. of body weight) was administered orally one hour before the injection of benzoquinone. The $ED_{50}$ value was determined as the dose diminishing to 50% the cumulative number of writhing for 30 minutes.

TABLE 4

| Compound: | $ED_{50}$ (mg./kg.) |
|---|---|
| E | 40 |
| G | 100 |
| Oxyphenbutazone | 200 |
| Mefenamic acid | 120 |

TOXICITY

Acute toxicity in terms of mean lethal dose ($LD_{50}$) of the compounds when administered intraperitoneally to mice was as follows:

TABLE 5

| Compound: | $LD_{50}$ (mg./kg.) |
|---|---|
| A | 260 |
| B | 240 |
| C | 240 |
| D | 340 |
| E | 240 |
| F | 300 |
| Oxyphenbutazone | 135 |

In view of various tests including those mentioned above, the Compounds I of the invention and pharmaceutically acceptable acid addition salts thereof can be administered safely as analgesics and antiinflammatory agents in the form of a pharmaceutical composition in admixture with a suitable and conventional carrier or adjuvant, administrable orally or by way of injection, without giving harm to the host.

The pharmaceutical composition can take the form of tablet, granule, powder or capsule for oral administration, of injection for subcutaneous or intramuscular administration, or of cream, ointment, suppository etc. for topical administration.

Among these preparations, forms of tablet, granule, powder, capsule and injection are especially preferable.

The following are the examples of the formulation to be taken when one of the Compounds I and the acid addition salts of the present invention is administered for pharmaceutical purposes.

(A) TABLET

| | Mg. |
|---|---|
| Compound (I) | 25 |
| Lactose | 74 |
| Starch | 20 |
| Magnesium stearate | 1 |

(B) CAPSULE

| | Mg. |
|---|---|
| Compound (I) | 25 |
| Lactose | 109 |
| Starch | 4.7 |
| Magnesium stearate | 1.3 |

(C) POWDER

| | Mg. |
|---|---|
| Compound (I) | 100 |
| Lactose | 650 |
| Starch | 250 |

(D) INJECTION

| | Mg. |
|---|---|
| Compound E | 20 |
| Sodium chloride | 18 |
| Water for injection | (1) |

[1] A sufficient quantity to make 2 milliliters.

Usual daily dose of the Compound I or salt thereof, lies in the range of about 25 to about 300 milligrams, more practically about 50 to about 200 milligrams per human adult. Thus, in case of tablets each containing 25 milligrams of Compound I or salt thereof, one to twelve tablets per day are administered.

The present invention is further explained by way of the following illustrative examples. It is to be noted that the abbreviations "g.", "mg.", "kg." and "ml." mean "gram(s)," "milligram(s)," "kilogram(s)" and "milliliter(s)," respectively.

Example 1

To a solution of 5.8 g. of 11 - methyl-dibenzo(c,g)-(1,2,6)thiadiazocin-6-one 12,12-dioxide in 100 ml. of dimethylformamide, there is added 1 g. of sodium amide, and the mixture is heated with stirring at 100° C. for 1 hour. After cooling to 60° C., 4 g. of 3-diethylaminopropyl chloride is added in small portions and the whole is heated at 100° C. for 5 hours. The solvent is distilled off, and the remaining oily residue is dissolved in 150 ml. of diluted hydrochloric acid, and then extracted with ether. The aqueous hydrochloric acid layer is made alkaline, and the precipitates are crystallized from isopropanol to give 4 g. (53.3% yield) of 11-methyl-5-(3-diethylaminopropyl)-dibenzo-(c,g)(1,2,6)thiadiazocin - 6 - one 12,12-dioxide melting at 104° to 105° C.

The product is dissolved in ethanol, and hydrochloric acid is added to give the hydrochloride with 0.5 molecule of water of crystallization melting at 138° to 140° C.

Example 2

Metallic sodium (0.6 g.) is added to 50 ml. of liquid ammonia, and the mixture is stirred. Then the ammonia is distilled off. Anhydrous toluene (75 ml.) is added. To the mixture is added 6.7 g. of 11-methyl-dibenzo(c,g)-(1,2,6)thiadiazocin-6 - one 12,12-dioxide, and then the whole is refluxed for 1 hour. After cooling to 30° C., 4.2 g. of 2-morpholinoethyl chloride is added and the remaining mixture is heated gradually to 100° C. and the heating is continued for 5 hours. Then the solvent is distilled off, the residue is extracted with hydrochloric acid and the extract layer is made alkaline. The precipitates are dissolved in ethanol and hydrochloric acid is added to give 5 g. (49.4%) of 11-methyl-5-(2-morpholino-ethyl)-dibenzo(c,g)(1,2,6)thiadiazocin-6-one 12,12-dioxide hydrochloride melting at above 265° C.

Example 3

To a suspension of 0.5 g. of sodium hydride in 100 ml. of toluene, there is added 6 g. of 11-ethyl-dibenzo(c,g)-(1,2,6)thiadiazocin-6-one 12,12-dioxide. The mixture is heated on a water bath for 10 minutes. To this is added 4 g. of 1-methyl-2-dimethylaminoethyl chloride and the whole is refluxed for 5 hours. After cooling, the solvent is distilled off. The residue is extracted with diluted hydrochloric acid and the extract layer is made alkaline. The precipitated crystals are dissolved in ethyl acetate and fumaric acid is added to give 6 g. (58%) of 11-ethyl-5-(1-methyl-2 - dimethylaminoethyl)-dibenzo(c,g)-(1,2,6)-thiadiazocin-6-one 12,12-dioxide fumarate melting at 186° to 187° C.

Examples 4 to 17

Other examples of compound of Formula I which can be produced from an 11 - R-dibenzo(c,g)(1,2,6)thiadiazocin-6-one 12,12-dioxide and an aminoalkyl chloride in a manner similar to that described in Examples 1 to 3 are as follows:

(4) 11-methyl-5-(3 - dimethylaminopropyl)-dibenzo-(c,g)(1,2,6)thiadiazocin-6-one 12,12-dioxide hydrochloride melting at 208° to 210° C.

(5) 11-methyl-5-(3 - piperidinopropyl)-dibenzo(c,g)-(1,2,6)thiadiazocin-6-one 12,12 - dioxide hydrochloride with 1 molecule of water of crystallization melting at 141° to 143° C.

(6) 11-methyl - 5 - (2-methyl-3-dimethylaminopropyl)-dibenzo(c,g)(1,2,6)thiadiazocin - 6 - one 12,12-dioxide oxalate with 0.5 molecule of water of crystallization melting at 151° to 154° C., and its hydrochloride with 0.5 molecule of water of crystallization melting at 127° to 129° C.

(7) 11 - methyl - 5 - (2-methyl-3-(4-methyl-1-piperazinyl)-propyl)-dibenzo(c,g)(1,2,6)thiadiazocin - 6 - one 12,12-dioxide maleate with 0.5 molecule of water of crystallization melting at 167° to 168° C.

(8) 11-butyl - 5 - (2 - methyl-3-piperidinopropyl)-dibenzo(c,g)(1,2,6)thiadiazocin - 6 - one 12,12-dioxide hydrochloride with 0.5 molecule of water of crystallization melting at 141° to 144° C.

(9) 11-benzyl - 5 - (3 - (N-methyl-N-phenylamino)-propyl)-dibenzo(c,g)(1,2,6)thiadiazocin-6-one 12,12 - dioxide hydrochloride melting at 196° to 200° C.

(10) 11 - methyl - 5 - (3-(2-methylpiperidino)propyl)-dibenzo(c,g)(1,2,6)thiadiazocin-6-one 12,12-dioxide hydrochloride with 1 molecule of water of crystallization melting at 148° to 150° C.

(11) 11 - methyl - 5 - (2 - methyl - 3-(4-phenyl-1-piperazinyl)-propyl)-dibenzo(c,g)(1,2,6)thiadiazocin - 6-one 12,12-dioxide hydrochloride with 1 molecule of water of crystallization melting at 105° to 110° C.

(12) 11 - methyl - 5 - (2 - dimethylaminoethyl)-dibenzo(c,g)(1,2,6)thiadiazocin-6-one 12,12-dioxide hydrochloride melting at 232° C.

(13) 11-isopropyl - 5 - (2 - dibenzylaminoethyl)-dibenzo(c.g.)(1,2,6)thiadiazocin - 6 - one 12,12-dioxide hydrochloride melting at 189° to 193° C.

(14) 3,11 - dimethyl-5-(2-methyl-3-morpholinopropyl)-dibenzo(c,g)(1,2,6)thiadiazocin - 6 - one 12,12-dioxide fumarate with 1 molecule of water of crystallization melting at 205° to 206° C.

(15) 11-methyl-3-methoxy-5-(3-piperidinopropyl) - dibenzo(c,g (1,2,6)thiadiazocin-6-one 12,12-dioxide fumarate melting at 222° to 223° C.

(16) 11-methyl-3-chloro-5-(1-methyl-2-dimethylaminoethyl)dibenzo(c,g)(1,2,6)thiadiazocin - 6 - one 12,12 - dioxide fumarate melting at 190° C.

(17) 11-methyl-3-trifluoromethyl-5-(3 - dimethylaminopropyldibenzo(c,g)(1,2,6)thiadiazocin-6-one 12,12-dioxide fumarate melting at 215° to 216° C.

The starting compounds of Formula II are, for example, produced as follows:

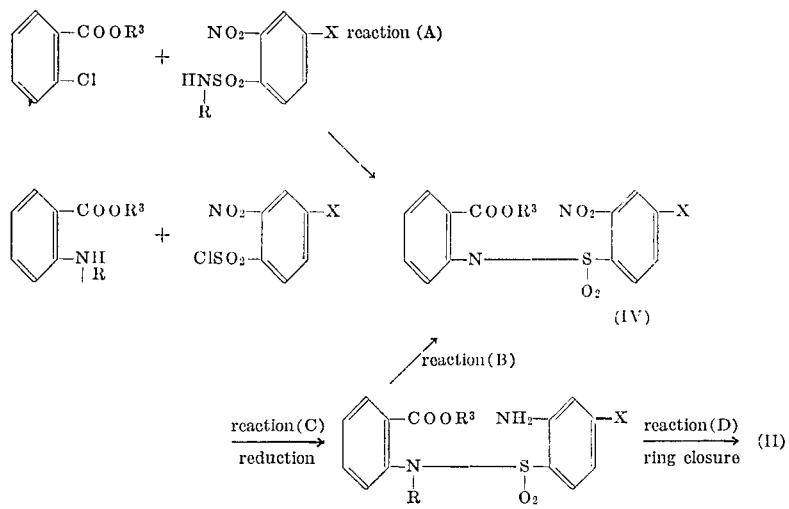

wherein R and X are of the same meaning as in the Formula I, and R³ is alkyl of 1 to 4 carbon atoms.

The reactions (A) and (B) are carried out in the presence of a deacidifying agent such as pyridine at an elevated temperature for one to ten or more hours. The compounds of Formula IV wherein R is H are converted into the compounds of Formula IV wherein R is alkyl by reaction with an alkylating agent such as alkyl halide or dialkyl sulfate, in an inert solvent in the presence of a deacidifying agent.

The reaction (C) is carried out by reducing the compounds of Formula IV with Fe–HCl, Zn–HCl, ZnCl₂–HCl, etc. in water. The compounds of Formula V wherein R is H are converted into the compounds wherein R is alkyl by reaction with an alkylating agent in an inert solvent in the presence of a deacidifying agent. Moreover, the compound of Formula V wherein R³ is alkyl is converted into the compound wherein R³ is H by treating the Compound V with an alkaline reagent such as potassium hydroxide in an inert solvent.

The reaction (D) is carried out, (i) when R³ is alkyl, by heating the compound of Formula V at 150° to 300° C., and (ii) when R³ is H, by stirring at room temperature a solution of the compound of Formula V in an inert solvent in the presence of a dehydrating agent such as diphosphorus pentoxide, phosphorus pentachloride, phosphorus trichloride, thionyl chloride, sulfuric acid, hydrochloric acid or dicyclohexylcarbodiimide, and then heating to complete the reaction.

Specific examples of reactions (A), (B), (C) and (D) are given below.

Reaction (A)

Ethyl o-chlorobenzoate (18.5 g.) is added dropwise to an ice-cooled solution of 21.6 g. of N-methyl-o-nitrobenzenesulfonamide in 100 ml. of pyridine and the whole is heated on a boiling water bath for 5 hours. After cooling, the reaction mixture is poured into ice water. The precipitated crystals are collected by filtration and recrystallized from ethanol to give 28.3 g. (81%) of N-methyl-2-nitro-2'-ethoxycarbonylbenzenesulfanilide melting at 101° to 102° C.

Reaction (B)

(1) A mixture of 50 g. of ethyl anthranilate, 57 g. of o-nitrobenzenesulfonyl chloride and 150 ml. of pyridine is heated at 80° C. for 2 hours. The reaction mixture is poured into ice water, and the precipitated crystals are collected by filtration and recrystallized from ethyl acetate to give 77 g. (80.3%) of 2-nitro-2'-ethoxycarbonyl-benzenesulfanilide melting at 129° to 130° C.

(2) Dimethyl sulfate (30 g.) is added dropwise with stirring to a mixture of 70 g. of 2-nitro-2'-ethoxy-carbonyl-benezenesulfanilide, 300 ml. of acetone and 50 g. of potassium carbonate, and the whole is refluxed for 3 hours. The reaction mixture is poured into 1 liter of cold water. The precipitated crystals are collected by filtration and recrystallized from ethanol to give 53.5 g. (74%) of N-methyl-2-nitro-2'-ethoxycarbonylbenzenesulfanilide melting at 101° to 102° C.

Reaction (C)

(1) N - methyl-2-nitro-2'-ethoxycarbonylbenzenesulfanilide powder (45 g.) is added in small portions at 80° to 90° C. to a mixture of 50 g. of iron powder, 250 ml. of water and 25 ml. of concentrated hydrochloric acid, and the whole is kept at 80° to 90° C. for 3 hours. The reaction mixture is cooled and extracted with methylene chloride. The iron powder is filtered off with Celite 545 (a diatomaceous earth) as filter aid, and the filtrate is dried and concentrated. Thus obtained crystals are recrystallized from methanol to give 40 g. (97%) of N-methyl - 2 - amino - 2' - ethoxycarbonylbenzenesulfanilide melting at 96° C.

(2) A mixture of 6.7 g. of N-methyl-2-amino-2'-ethoxy-carbonylbenzenesulfanilide, 50 ml. of ethanol and 1.2 g. of potassium hydroxide is heated on a water bath for 1 hour, and the ethanol is distilled off. The residue is dissolved in water and acidified with hydrochloric acid. The precipitated crystals are collected by filtration and recrystallized from methanol to give 4 g. (65%) of N-methyl-2-amino-2'-carboxybenzenesulfanilide melting at 180° to 183° C.

Reaction (D)

(1) N-methyl-2-amino - 2' - ethoxycarbonylbenzenesulfanilide (10 g.) is heated on an oil bath at 250° to 260° C. for 1 hour. The reaction mixture is dissolved in a small amount of ethanol, and the whole is treated with activated charcoal and cooled to give 5.3 g. (67%) of 11-methyl-dibenzo(c,g)(1,2,6)thiadiazocin-6-one 12,12-dioxide melting at 269° to 270° C.

(2) Thionyl chloride (19.3 g.) is added dropwise to an ice-cooled solution of 33 g. of N-methyl-2-amino-2'-carboxybenzenesulfanilide in 300 ml. of chloroform, and the whole is stirred at room temperature for 2 hours and then heated on a water bath for 1 hour. The chloroform is distilled off and the remaining crystals are recrystallized from methanol to give 21.4 g. (69%) of 11-methyl-dibenzo (c,g)(1,2,6)thiadiazocin-6-one 12,12-dioxide melting at 269° to 270° C.

What is claimed is:

1. A compound selected from the group consisting of a dibenzothiadiazocine of the formula

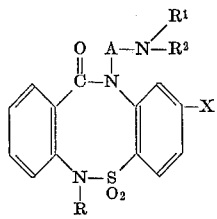

wherein X is a member selected from the group consisting of H, Cl, OCH₃, CH₃ and CF₃, R is a member selected from the group consisting of benzyl and alkyl of 1 to 4 carbon atoms, each of $R^1$ and $R^2$ independently is a member selected from the group consisting of alkyl of 1 to 4 carbon atoms, phenyl and benzyl, or —N($R^1$)($R^2$) represents a member selected from the group consisting of morpholino, piperidino, 2-methyl-piperidino, 4-methyl-1-piperazinyl and 4-phenyl-1-piperazinyl, and A is alkylene of 2 to 4 carbon atoms, and pharmaceutically acceptable acid addition salts thereof.

2. A compound as in claim 1, said compound being 11 - methyl - 5 - (3 - dimethylaminopropyl)-dibenzo(c,g)(1,2,6)thiadiazocin-6-one 12,12-dioxide.

3. A compound as in claim 1, said compound being 11 - methyl-5-(3-diethylaminopropyl)-dibenzo(c,g)(1,2,6) thiadiazocin-6-one 12,12-dioxide.

4. A compound as in claim 1, said compound being 11-methyl - 5 - (2-morpholinoethyl)-dibenzo(c,g)(1,2,6) thiadiazocin-6-one 12,12-dioxide.

5. A compound as in claim 1, said compound being 11-ethyl-5-(1-methyl-2-dimethylaminoethyl)-dibenzo(c,g)(1,2,6)thiadiazocin-6-one 12,12-dioxide.

6. A compound as in claim 1, said compound being 11-methyl - 5 - (3-piperidinopropyl)-dibenzo(c,g)(1,2,6) thiadiazocin-6-one 12,12-dioxide.

7. A compound as in claim 1, said compound being 11 - methyl-5-(2-methyl-3-dimethylaminopropyl)-dibenzo (c,g)(1,2,6)thiadiazocin-6-one 12,12-dioxide.

8. A compound as in claim 1, said compound being 11-methyl-5-(2-methyl-3-(4-methyl-1-piperazinyl)propyl)-dibenzo(c,g)(1,2,6)thiadiazocin-6-one 12,12-dioxide.

9. A compound as in claim 1, said compound being 11-butyl-5-(2-methyl - 3 - piperadinopropyl)dibenzo(c,g)(1,2,6)thiadiazocin-6-one 12,12-dioxide.

10. A compound as in claim 1, said compound being 11-benzyl-5-(3-N-methyl - N - phenylamino)-propyl)-dibenzo(c,g)(1,2,6)thiadiazocin-6-one 12,12-dioxide.

11. A compound as in claim 1, said compound being 11 - methyl - 5 - (3-(2-methylpiperidino)propyl)-dibenzo (c,g)(1,2,6)thiadiazocin-6-one 12,12-dioxide.

12. A compound as in claim 1, said compound being 11-methyl-5-(2-methyl-3-(4-phenyl-1-piperazinyl)-propyl) dibenzo(c,g)(1,2,6)thiadiazocin-6-one 12,12-dioxide.

13. A compound as in claim 1, said compound being 11 - methyl - 5 - (2 - dimethylaminoethyl)-dibenzo(c,g)(1,2,6)thiadiazocin-6-one 12,12-dioxide.

14. A compound as in claim 1, said compound being 11 - isopropyl - 5 - (2 - dibenzylaminoethyl)-dibenzo(c,g)(1,2,6)thiadiazocin-6-one 12,12-dioxide.

15. A compound as in claim 1, said compound being 3,11 - dimethyl-5-(2-methyl-3-morpholinopropyl)-dibenzo (c,g)(1,2,6)thiadiazocin-6-one 12,12-dioxide.

16. A compound as in claim 1, said compound being 11 - methyl - 3 - methoxy-5-(2-piperidinopropyl)-dibenzo (c,g)(1,2,6)thiadiazocin-6-one 12,12-dioxide.

17. A compound as in claim 1, said compound being 11 - methyl-3-chloro-5-(1-methyl-2-dimethylaminoethyl)-dibenzo(c,g)(1,2,6)thiadiazocin-6-one 12,12-dioxide.

18. A compound as in claim 1, said compound being 11-methyl - 3 - trifluoromethylphenyl-5-(3-dimethylaminopropyl)-dibenzo(c,g)(1,2,6)thiadiazocin-6-one 12,12 - dioxide.

19. A compound as in claim 1, wherein the acid addition salt is a hydrochloride.

20. A compound as in claim 1, wherein the acid addition salt is a fumarate.

References Cited

Wright et al.: "J. Heterocyclic Chem.," vol. 5, No. 4, pp. 453–459 (1968).

HENRY R. JILES, Primary Examiner

R. J. BOND, Assistant Examiner

U.S. Cl. X.R.

424—275, 268, 248, 250